Feb. 26, 1924. Re. 15,779

H. C. TROST

AUTOMATIC INTERLOCKING ATTACHMENT FOR WINDOW SASHES

Original Filed April 17, 1922 2 Sheets-Sheet 1

INVENTOR
Henry C. Trost
BY Davis & Davis
ATTORNEYS

Feb. 26, 1924. Re. 15,779

H. C. TROST

AUTOMATIC INTERLOCKING ATTACHMENT FOR WINDOW SASHES

Original Filed April 17, 1922 2 Sheets-Sheet 2

INVENTOR
Henry C. Trost
BY Davis & Davis
ATTORNEYS

Reissued Feb. 26, 1924. Re. 15,779

UNITED STATES PATENT OFFICE.

HENRY C. TROST, OF EL PASO, TEXAS.

AUTOMATIC INTERLOCKING ATTACHMENT FOR WINDOW SASHES.

Original No. 1,439,585, dated December 19, 1922, Serial No. 553,711, filed April 17, 1922. Application for reissue filed April 25, 1923. Serial No. 634,632.

*To all whom it may concern:*

Be it known that I, HENRY C. TROST, a citizen of the United States, residing at El Paso, in the county of El Paso, State of Texas, have invented certain new and useful Improvements in Automatic Interlocking Attachments for Window Sashes; and I do hereby declare the following to be a full, clear, and exact description of the invention, such as will enable others skilled in the art to which it appertains to make and use the same.

My invention relates to improvements in automatic interlocking attachments for use in connecting sliding window sashes, or the like, to each other so that the two may be moved as one, but at the same time may be held in the predetermined relation to each other; thus permitting the sashes to be slid together up or down, leaving an air space below or above, or both below and above, the interlocked sashes.

My invention will be more fully understood after reference to the accompanying drawings, in which like parts are indicated by similar reference symbols throughout the several views, and in which:—

Figure 5:
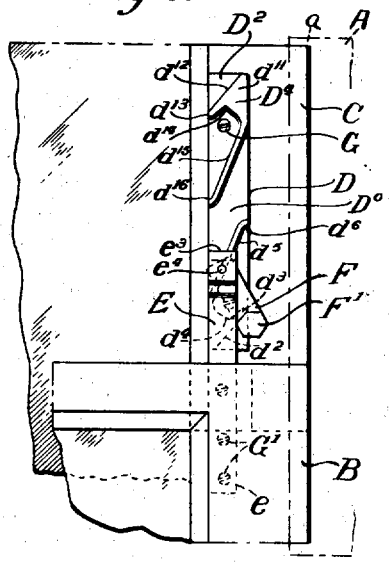
Figure 5 is a similar view to Fig. 4, but shows the parts in the position just before the sashes are interlocked.
Figure 3:
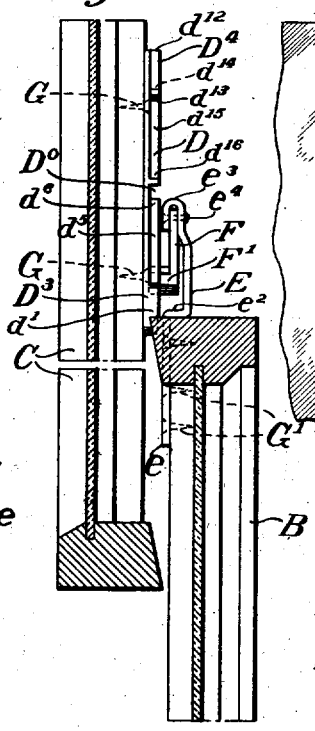
Figure 3 is a similar view to Fig. 2, except that the two sashes have been moved relative to each other, and are in the interlocked position, but both may now be moved by pressure applied to either one.
Figure 4:
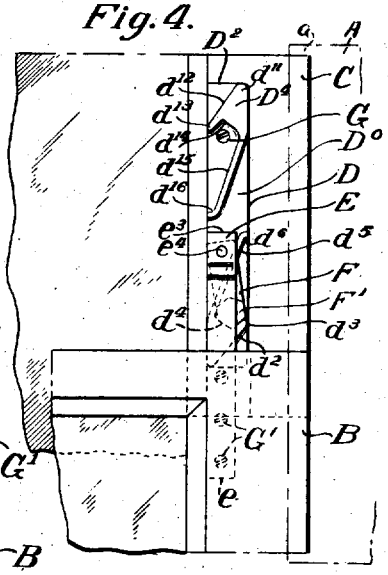
Figure 4 is a view of the parts shown in Fig. 3, as seen from the right of said figure.

A represents the window frame which may be of the usual or preferred construction provided with the usual guide strip or separating strip *a*, which is mounted between the sashes, and is shown only in Figs. 4 and 5. This separating strip is a common expedient with window frames, and is not shown in Figs. 2, 3 and 10 in order to more clearly bring out the other parts.

B represents the lower sash of the window, and C the upper sash of the window which is mounted to slide vertically in the usual way.

As thus described the parts are all old and well known in the art, and it is my purpose to apply the invention to windows and window frames of standard construction without requiring any alterations in the manufacture of the same by the builder or contractor. My invention is more especially intended to provide the removable attachment or attachments which will now be described.

In Figs. 1 to 5 I have shown mounted on opposite sides of the upper window sash C the reversely-disposed trip plates D and D′ which are adapted to be respectively engaged by the lugs F′, carried by the pendulum locks F, which are pivoted to the strips E, attached to the lower window sash.

As will be shown later, it is immaterial whether the trip plates be attached to the upper sash and the pendulum lock to the lower sash, or whether the contrary arrangement be made.

Referring first to Figs. 1 to 9, the trip plates D and D′ are each provided with a base plate $D^2$ adapted to be connected by means of suitable screws G passing through to the upper sash frame. These screws pass through perforations $d$ in the base plate $D^2$. This base plate is provided with the outwardly-projecting portions $D^3$ and $D^4$. The projection $D^3$ is provided with a wedge-shaped lower portion $d'$, having the cam face $d^2$ terminating in the hook $d^3$, which hook forms the outer wall of the pocket $d^4$, which pocket is adjacent to the rib $d^5$ whose end is preferably rounded somewhat as at $d^6$. The oppositely-disposed projecting portion $D^4$ is provided with similar, but reversely-disposed parts $d^{11}$, $d^{12}$, $d^{13}$ and $d^{14}$, and with a rib $d^{15}$, preferably rounded as at $d^{16}$. Between these ribs $d^5$ and $d^{15}$ is a passage or channel $D^0$.

Figure 6:
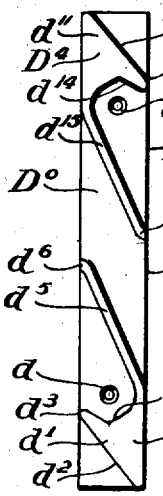
Figures 6 and 7 are detail views showing on a larger scale the oppositely-disposed trip plates which are used in my invention.
Figure 7:
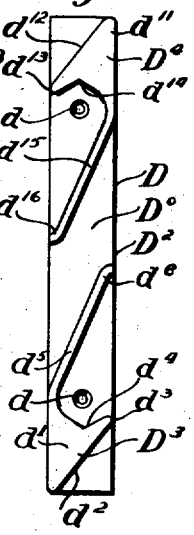
Figure 8:
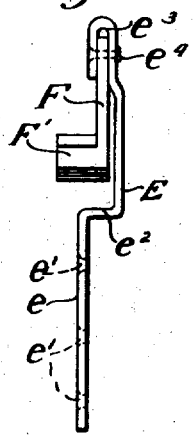
Figure 8 is a detail showing one of the pendulum locks and the strip carrying the same used in my invention.

The construction of the two trip plates D and D′ is the same, except that the parts are reversed as shown in Figs. 6 and 7. The locking arrangement coacting with the trip plate comprises the metal strip E which is provided with a tail $e$, perforated, as at $e'$, to receive the screws G′ by means of which the strips E may be fastened to the lower sash of the window. The strip E is bent outwards, as at $e^2$, and is provided at its upper end with a loop $e^3$ through which passes the bolt $e^4$, to which the stem of the pendulum lock F is pivoted. This lock carries the locking lug F′ which is shown in Figs. 1 to 10 as hexagonal in shape, but this locking lug may be of any cross section, for instance of the elliptical cross section shown in Fig. 12.

The transverse thickness of the locking arrangement is such that the coacting parts can be placed in the normal clearance space between the two sashes as they slide up or down.

The operation of the device as illustrated in Figs. 1 to 10 is as follows:—

Figure 1:
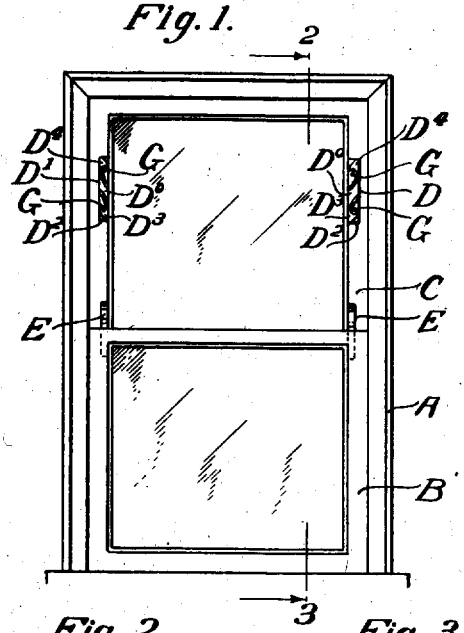
Figure 1 is a view of the two sashes with the window closed.
Figure 2:
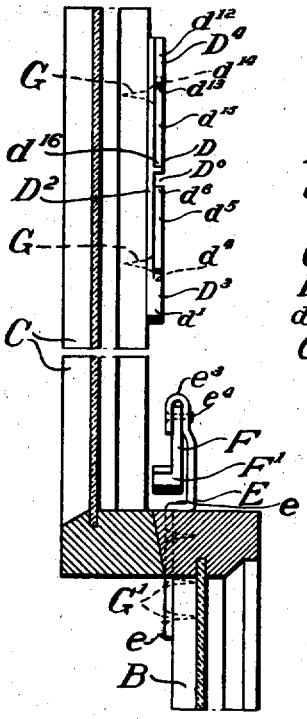
Figure 2 is a section of a portion of the device shown in Fig. 1 along the line 2—3 of said figure and looking in the direction of the arrows, the framework of the window being omitted for the sake of clearness in the drawings, and the parts being shown on a larger scale.

Suppose the two sashes to be in the position assumed when the window is closed, which is the position shown in Figs. 1 and 2; now it will be obvious that the coacting locking members are then entirely apart, and do not interfere in any way with the normal closing tight of the window. Now if the lower sash be raised, as in the ordinary way, the locking lugs F′ on opposite sides of the lower sash will strike the cam faces $d^2$ on the two trip plates D and D′, and the pendulum locks will be swung to the outward position, as indicated to the right of Fig. 9. As soon as the lugs F′ pass the corresponding hooks $d^3$, the pendulum will swing back against the rib $d^5$ and a slight downward movement of the lower sash will lock the two together. By then pulling down the lower sash, the two sashes may be moved to the desired position with an air opening above the upper sash and below the lower sash.

If it is desired to make the air opening through the window still larger, the lower sash is shoved still higher, when the inclined ribs $d^5$ on the upper sash will wedge the lugs F′ to the outward position again, and the lower sash may be slid freely past the upper sash until the lugs F′ are above the upper edge of the cam faces $d^{12}$. At this time the pendulum lugs will tend to swing back to the vertical position, and a slight downward movement of the lower sash will cause the pendulum lugs to swing inwards, as indicated to the left of Fig. 9, and these lugs will pass the hooks $d^{13}$ and will swing into the pockets $d^{14}$. At this time an upward movement of the lower sash will tend to close the gap at the top of the two sashes, but will leave a large air space below the lower sash.

If it is desired to close the window entirely, push up on the lower sash until the upper sash has reached its highest position, then pull down the lower sash again and the pendulum lock will automatically swing clear, riding down on the ribs $d^{15}$, past the channel $D^0$, and the lower sash may be completely closed.

If the upper sash is at any time in the desired position, the lower sash may be closed without disturbing the upper sash by pushing on the same until the lugs F′ register with the passages $D^0$. At this time these lugs will swing into said passages, and pulling down on the lower sash will simply permit the lug F′ to pass through said passages without disturbing the upper sash, and the lower sash may be returned to the closed position.

Thus it will be seen that the lower sash may be moved independently of the upper sash, or the two sashes may be moved together as desired, without necessitating the operator touching the upper sash at all. This is a great convenience especially with high windows, or short persons.

Figure 10:
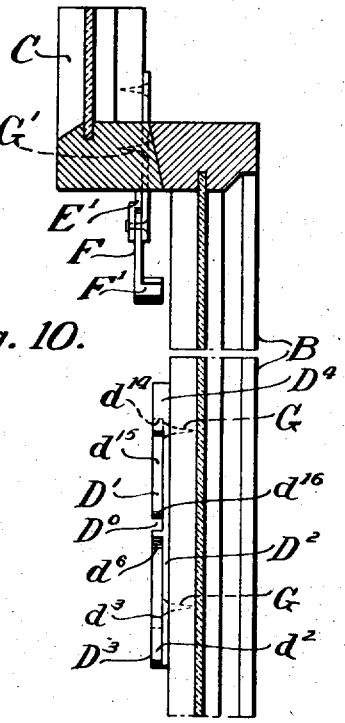
Figure 10 is a similar view to Fig. 2, but shows the trip plate applied to the lower sash, and the pendulum lock applied to the upper sash, certain details being slightly altered from the preceding figures.

In the construction of the device shown in Figs. 1 to 5, the interlocking parts are shown as mounted on the inside of the window, but to meet the capricious requirements of the user it may be preferred to mount the same on the outside of the window, in which case the parts would be reversed as shown in Fig. 10; that is, the trip plates would be attached to the lower sash and the pendulum lock would be attached to the upper sash, the parts otherwise being the same as already described.

While I have shown two sets of interlocking devices mounted, respectively, at opposite sides of the window, it will be obvious that under certain conditions a single set on one side only of the window will suffice; but the parts will be better balanced and will operate more satisfactorily if the devices are mounted in pairs on opposite sides of the window.

It will be noted that the trip plates shown in detail in Figs. 6 and 7 are of the same construction, but become rights and lefts when one is turned upside down relative to the other.

Figure 11:
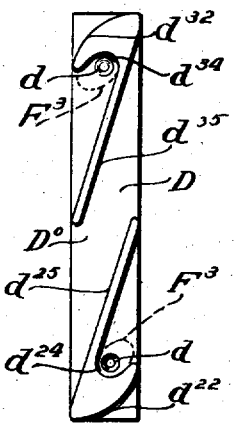
Figure 11 is a detail showing a modified form of trip plate which may be used in my invention.
Figure 12:
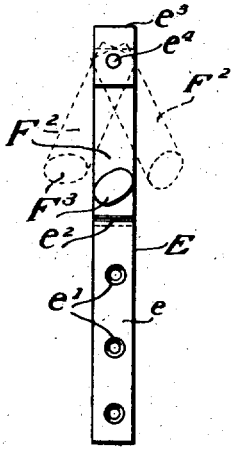
Figure 12 shows a modified form of pendulum lock which may be used in connection with the trip plate shown in Figs. 1 to 11 inclusive.

In the modification shown in Fig. 11 a slightly different form of trip plate is used, in which the cam faces $d^{22}$ and $d^{32}$ are rounded, and the pockets $d^{24}$ and $d^{34}$ are of curved cross section, while the ribs $d^{25}$ and $d^{35}$ are straight; and in coaction with such trip plates I provide the locking pendulum of the form shown in Fig. 12, in which the locking pendulum $F^2$ is provided with elliptical lugs $F^3$. In Figs. 11 and 12 I have shown only one of the trip plates and corresponding locking pendulums. The other plates and pendulums would be obviously reversely disposed.

Figure 9:
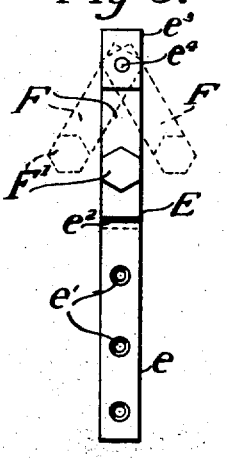
Figure 9 is a view of the device shown in Fig. 8 as seen from the left of said figure, the pendulum lock being shown in full lines in the inoperative position and in dotted lines in the operative and displaced positions, respectively.

The device constructed in this way will operate somewhat more smoothly than if the locking lugs were angular in cross section as shown in Fig. 9.

With the arrangement shown in Figs. 11 and 12 the parts may be assembled and will operate in the same way as the similar parts shown in Figs. 1 to 10.

While I have shown the invention in its preferred form or forms, it will be obvious that various modifications might be made in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:

1. An interlocking attachment for window sashes comprising two coacting parts, a trip plate fastened to one sash and a pendulum lock connected to the other sash, the said trip plate being provided with raised portions separated by an inclined channel, said raised portions being provided with wedge faces, and pockets, and said pendulum lock being provided with a laterally projecting lug adapted to engage said wedge faces, and to project into said pockets and to pass through said inclined passage, substantially as described.

2. An interlocking attachment for window sashes comprising two sets of coacting parts, each set including a trip plate fastened to one sash, and a pendulum lock connected to the other sash, the sets being arranged in pairs on opposite sides of the window, the said trip plates being provided with raised portions separated by an inclined channel, said raised portions being provided with wedge faces and pockets, and said pendulum locks being each provided with a laterally projecting lug adapted to engage said wedge faces, and to project into said pockets, and to pass through said inclined passages, substantially as described.

3. An interlocking attachment for window sashes comprising two coacting parts, a trip plate fastened to one sash and a pendulum lock connected to the other sash, the said trip plate being provided with raised portions separated by an inclined channel, said raised portions being provided with wedge faces and pockets, and said pendulum lock comprising a strip secured to the other sash and a pendulum suspended from said strip provided with a laterally projecting lug adapted to engage said wedge faces, and to project into said pockets, and to pass through said inclined passage, substantially as described.

4. An interlocking attachment for window sashes comprising two sets of coacting parts, each set including a trip plate fastened to one sash, and a pendulum lock connected to the other sash, the sets being arranged in pairs on opposite sides of the window, the said trip plates being provided with raised portions separated by an inclined channel, said raised portions being provided with wedge faces and pockets, and said pendulum lock comprising a strip secured to the other sash and a pendulum suspended from said strip each pendulum being provided with a laterally projecting lug adapted to engage said wedge faces, and to project into said pockets, and to pass through said inclined passages, substantially as described.

5. An interlocking attachment for window sashes comprising two coacting parts, a trip plate fastened to one sash and a pendulum lock connected to the other sash, the said trip plate being provided with a raised portion provided with a wedge face, and a pocket, and said pendulum lock being provided with a laterally projecting lug adapted to engage said wedge face, and to project into said pocket, substantially as described.

6. An interlocking attachment for window sashes comprising two sets of coacting parts, each set including a trip plate fastened to one sash, and a pendulum lock connected to the other sash, the sets being arranged in pairs on opposite sides of the window, each of said trip plates being provided with a raised portion having a wedge face, and a pocket above same, and said pendulum locks being each provided with a laterally projecting lug adapted to engage said wedge faces, and to project into said pockets, substantially as described.

7. An interlocking attachment for window-sashes comprising two co-acting parts, one a trip-plate fastened to one sash and the other a locking member connected to the other sash, said trip-plate being provided with raised portions separated by an inclined channel, said raised portions being provided with wedge faces and thrust-shoulders, said locking member being adapted to engage said wedge faces and engage said thrust-shoulders and pass through said inclined passage, as described.

8. An interlocking attachment for window sashes comprising two co-acting parts, one a trip-plate fastened to one sash and the other a pendulum locking member connected to the other sash, said trip-plate being provided with raised portions separated by an inclined channel, said raised portions being provided with wedge faces and thrust-shoulders, and said pendulum lock being provided with a laterally-projecting lug adapted to engage said wedge faces and said thrust-shoulders and to pass through said inclined passage.

9. An interlocking attachment for window sashes comprising two co-acting parts, one a trip-plate fastened to one sash and the other a pendulum lock connected to the other sash, said trip-plate being provided with a raised portion having a cam face and an adjacent thrust-shoulder, said pendulum lock being provided with a laterally-projecting lug adapted to engage said wedge face and automatically swing over and engage said thrust-shoulder.

In testimony whereof I hereunto affix my signature this 14th day of February, 1923.

HENRY C. TROST.